United States Patent
Najemy

[11] Patent Number: 5,809,256
[45] Date of Patent: Sep. 15, 1998

[54] SOFT POWER SWITCHING FOR HOT INSTALLATION AND REMOVAL OF CIRCUIT BOARDS IN A COMPUTER SYSTEM

[75] Inventor: Daniel Dennis Najemy, Grafton, Mass.

[73] Assignee: Data General Corporation, Westboro, Pa.

[21] Appl. No.: 661,504

[22] Filed: Jun. 11, 1996

[51] Int. Cl.⁶ .................................................. G06F 13/00
[52] U.S. Cl. ............................................................ 395/283
[58] Field of Search ..................................... 395/283, 750

[56] References Cited

U.S. PATENT DOCUMENTS

| | | | |
|---|---|---|---|
| 4,245,270 | 1/1981 | Busby | 361/58 |
| 5,317,697 | 5/1994 | Husak et al. | 395/283 |
| 5,473,499 | 12/1995 | Weir | 395/283 |
| 5,511,171 | 4/1996 | Bowman | 395/283 |
| 5,515,515 | 5/1996 | Kennedy et al. | 395/283 |
| 5,625,238 | 4/1997 | Ady et al. | 307/147 |
| 5,627,416 | 5/1997 | Kantner | 307/119 |
| 5,636,347 | 6/1997 | Muchnick | 395/283 |

*Primary Examiner*—Glenn A. Auve
*Attorney, Agent, or Firm*—Gary D. Clapp, Esq.

[57] ABSTRACT

A soft power switch for insertion and removal of a logic unit in a system during continuing operation of the system, including a current switch for each supply voltage to the logic unit that is to be protected, each current switch having a current input connected from a corresponding system power source and a current output connected to the logic unit. The switch includes a gate drive delay connected to each current switch that provides a gate signal controlling the flow of current through each current switch, and a connector having staggered connector pins for sequenced connection of power and control signals as the logic unit is inserted or withdrawn, the soft switch responding to the sequence of control and power signals by controllably and gradually increasing or decreasing the current through the current switches as the logic unit is inserted or withdrawn.

5 Claims, 9 Drawing Sheets

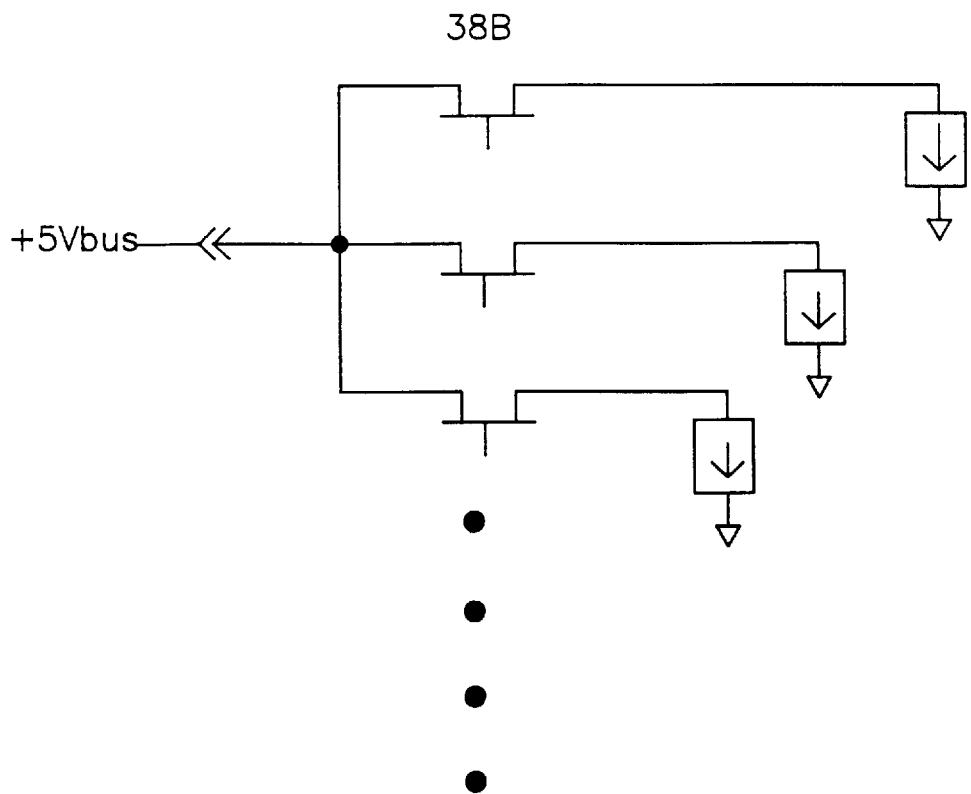
FIG. 5B
CURRENT GATE 38

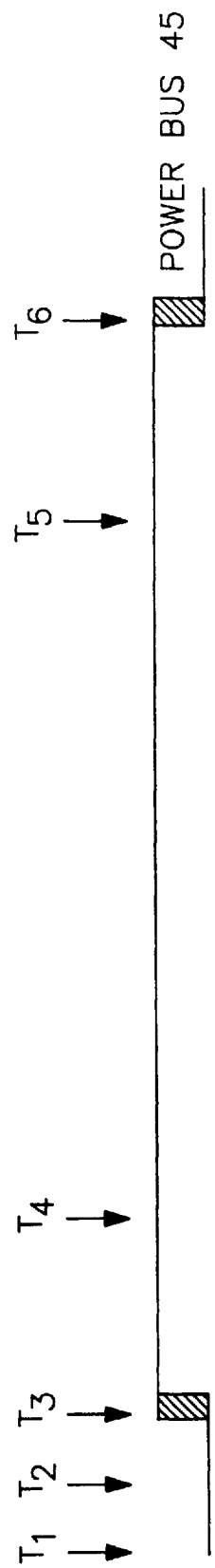
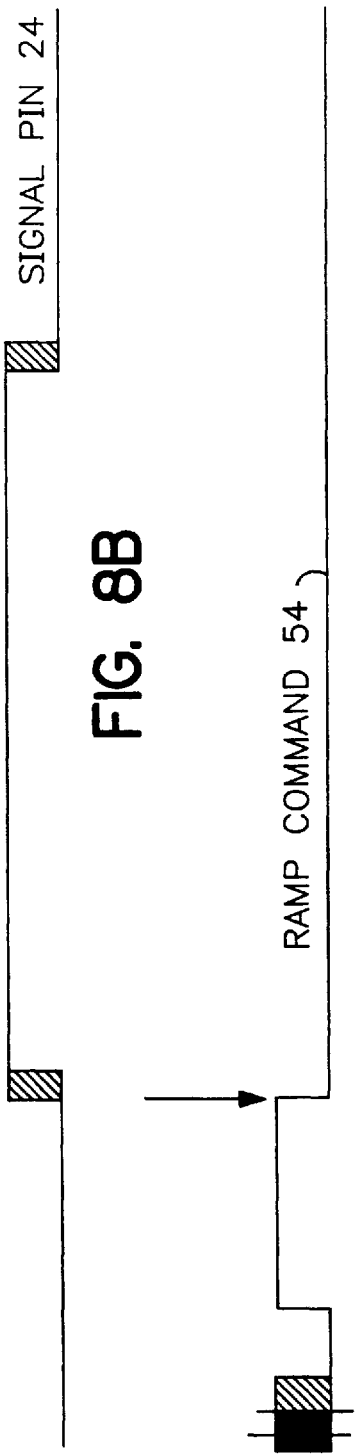

SOFT POWER SWITCHING FOR HOT INSTALLATION AND REMOVAL OF CIRCUIT BOARDS IN A COMPUTER SYSTEM

CROSS REFERENCES TO RELATED APPLICATIONS

The present patent application is related to U.S. patent application Ser. No. 08/661,503 filed Jun. 11, 1996 by Brian Martin for a BIOS MEMORY ADDRESS DECODER FOR PROVIDING AN EXTENDED BIOS MEMORY ADDRESS SPACE FOR MICROPROCESSOR BASED SYSTEMS, presently pending, to U.S. patent application Ser. No. 08/661,571 filed Jun. 11, 1996 by Michael Tehranian et al. for a DEVICE ACCESS CONTROLLER FOR VIRTUAL VIDEO/KEYBOARD/MOUSE INPUT/OUTPUT FOR REMOTE SYSTEM MANAGEMENT AND MAINTENANCE, presently pending, and to U.S. patent application Ser. No. 08/661,579 filed Jun. 11, 1996 by Robert Beauchamp et al. for a DEVICE ACCESS CONTROLLER AND REMOTE SUPPORT FACILITY FOR INSTALLATION OF CABLING IN A MULTIPROCESSOR SYSTEM, presently pending.

FIELD OF THE INVENTION

The present invention relates to an apparatus and method for installation and removal of functional units in a computer system and, in particular, to the "hot" installation and removal of circuit boards in a computer system while the computer system is in operation.

BACKGROUND OF THE INVENTION

There are many applications for computer systems, such as in finance, public service, and military applications, that essentially require that the systems be continuously available and a number of approaches have been developed for such systems to insure that such systems, frequently referred to as "high availability" systems, can continue operation in the even of a failure or fault. Some systems, for example, are provided with backup power systems and communications links. Other approaches deal with failures and faults in the computer systems themselves, for example, by fault and error monitoring, automatic data and operating state backup, and redundancy for critical functional units of the system. In the latter approach, for example, the critical functional units of the system, such as the processing unit and memories, are at least duplicated and the systems tasks divided among the units so that a function may be performed by one of the duplicate units if a unit falls.

A persistent problem with high availability systems, however, is the removal or installation of hardware components of the systems, such as circuit boards while the system is in operation as it is preferable, and often necessary, that the operation of the system not be interrupted at any time. The removal or installation of a circuit board, however, is necessary when a circuit board fails and is frequently necessary during routine maintenance or when upgrading the system. The "hot" installation or removal or a circuit board, however, may in itself disrupt the operation of the system for a number of reasons.

For example, when a circuit board is first plugged in the additional load on the power buses of the system frequently causes spikes in the system power and consequent disruption of the operation of the logic and circuitry of the system. In addition, the state of the logic and circuitry on the board being inserted is unknown when it is first inserted, and may rapidly change until power comes up to steady state on the circuit board. As a result, the logic and circuitry therein will frequently generate erroneous signals to the other units of the system until the power stabilized and the system has initialized the logic and circuitry on the board to operate with the remainder of the system. These problems also occur when a circuit board is removed from the system, and may result in additional problems if the logic and circuitry on the board are executing tasks, which are not interrupted, that other elements of the system are dependent upon.

While the prior art has attempted to solve these problems, for example, by power supply filter capacitors and time delay circuits that inhibit the outputs of a board for an initial period, these solutions have been generally unsatisfactory for a number of reasons. For example, it is rarely possible to assure the sequence in which the connections between a board and the system are made or broken when the board is installed or removed, so that the operation of power supply spike filter capacitors and time delay inhibits is uncertain. In addition, and even with the assistance of board latching mechanisms that attempt to control the speed with which a user can force a board into its connections or remove a board from its connections, an exuberant, hurried or irritated user of sufficient strength and speed can frequently insert or withdraw a board fast enough to foil the power supply spike filter capacitor and time delay circuits.

The present invention, however, provides a solution to these and other related problems of the prior art.

SUMMARY OF THE INVENTION

The present invention is directed to a soft power switch for insertion and removal of a logic unit in a system during continuing operation of the system. According to the present invention, the soft power switch includes a current switch for each supply voltage to the logic unit that is to be protected from insertion/removal surges and spikes on the power buses, wherein each current switch has a current input connected from a corresponding system power source and a current output connected to the logic unit. The switch includes a gate drive delay connected to each current switch that provides a gate signal controlling the flow of current through each current switch, and a connector for connecting the logic unit to a socket connected to at least the power sources of the system.

The connector has staggered connector pins and the socket has corresponding connecting receptacles and the connector pins include a first connector pin having a first extension to make a first contact between the logic unit and the soft power switch and a system ground as the logic unit connector is inserted into the socket, a second connector pin having a second extension less than the first extension to make a second contact to a system power source as the logic unit connector is inserted into the socket to provide power to the gate drive delay. The connector further has a plurality of third connector pins, each having a third extension less than the second extension to make a corresponding plurality of third contacts to corresponding system power sources as the logic unit connector is inserted into the socket, wherein one of the third connector pins provides a logic signal input from the socket to the gate delay driver and the remaining third connector pins each providing a corresponding connection between the input of a corresponding current switch and a corresponding system power source.

The gate drive delay is responsive to the logic signal input for generating a gate signal upon insertion of the logic unit into the socket wherein the gate signal increases with time to correspondingly increase the flow of current through each current gate over a predetermined period of time. In further embodiments, the gate drive delay is further responsive to the logic signal for generating a gate signal upon withdrawal of the logic unit from the socket that decreases with time to correspondingly decrease the flow of current through each current gate over the predetermined period of time.

In the preferred embodiment, the connector pins further include a fourth connector pin having a fourth extension that is less than the third extension and makes a corresponding fourth contact to a system power source to provide a logic signal as the logic unit is inserted into the socket. In this embodiment, the gate delay drive includes an in/out latch connected from one of the third connector pins providing power and from the logic signal and is responsive to the sequence of inputs from that third connector pin and from the logic signal to generate a ramp command output indicating whether the logic unit is being inserted into the socket or withdrawn. A ramp generator is in turn responsive to the ramp command for a generating a corresponding gate drive signal that increases or decreases over the predetermined period of time, and drives each current gate with a gate signal generated through a driver to provide a corresponding gate signal to the corresponding current gate to increase or decrease the flow of current through the current gates over the predetermined time period, depending upon whether the logic unit is being inserted or withdrawn.

The soft power switch may also include a local power supply connected from the second connector pin and receiving system power therefrom to provide power to the gate drive delay to drive the current gates into a saturated state at the end of the predetermined period of time.

DESCRIPTION OF THE DRAWINGS

The foregoing and other objects, features and advantages of the present invention will be apparent from the following description of the invention and embodiments thereof, as illustrated in the accompanying figures, wherein:

FIGS. 5A and 5B are block diagrams of current switch configurations;

FIG. 8; is a timing diagram illustrating the operation of the soft switch of the present invention; and, FIG. 9 is a block diagram of a soft switch of the present invention.

DESCRIPTION OF THE INVENTION

A. General Description of the Problem and a System Incorporating the Invention (FIGS. 1A–1D and 2)

Figure 1A:
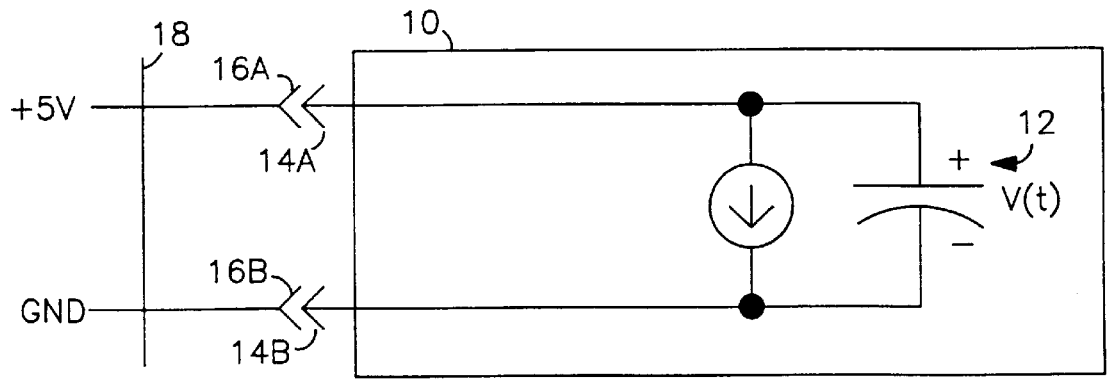
FIG. 1A is a diagrammatic representation of a system logic unit connecting to system buses.
Figure 1B:
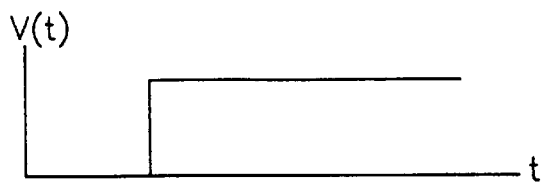
FIGS. 1B through 1D are diagrammatic representations of the effects of plugging a system logic unit into system buses.
Figure 1C:
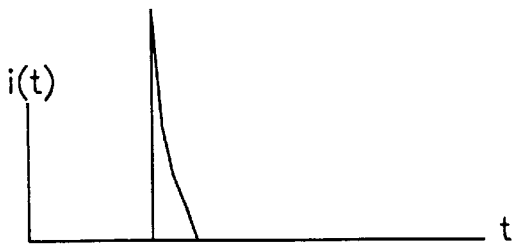
Figure 1D:
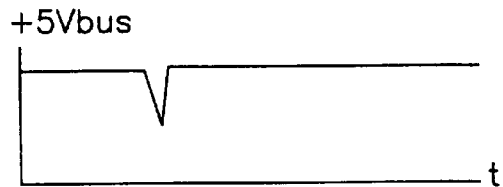

Referring to FIGS. 1A through 1D, therein is illustrated the essential problem that is addressed by the present invention. As shown in FIG. 1A, a Circuit Board 10 essentially presents a sudden capacitive load, represented by Capacitor 12, when Power Connections 14A, 14B are connected into the corresponding Power Connections 16A, 16B of a computer system Power Bus 18. When Circuit Board 10 is plugged into the power connections at a time T1, the voltage appearing across Capacitor 12 attempts to increase to the power supply voltage, as represented in FIG. 1B, and, as illustrated in FIG. 1C, there is a corresponding spike in the current drawn from the power supply and into Capacitor 12 to charge Capacitor 12. As illustrated in FIG. 1D, the current spike into Capacitor 12, in turn, causes a negative going voltage spike in the voltage on Power Bus 18 that, in turn, can disrupt the operation of other system components connected from Power Bus 18. As will be understood by those of ordinary skill and experience in the relevant arts, the reverse will occur when Circuit Board 10 is unplugged from Power Bus 18; in this instance, however, the inherent inductances of Power Bus 18 and the system power supply will result in a positive going voltage spike on Power Bus 18 that may again disrupt the operation of the system components connected from Power Bus 18.

Figure 2:
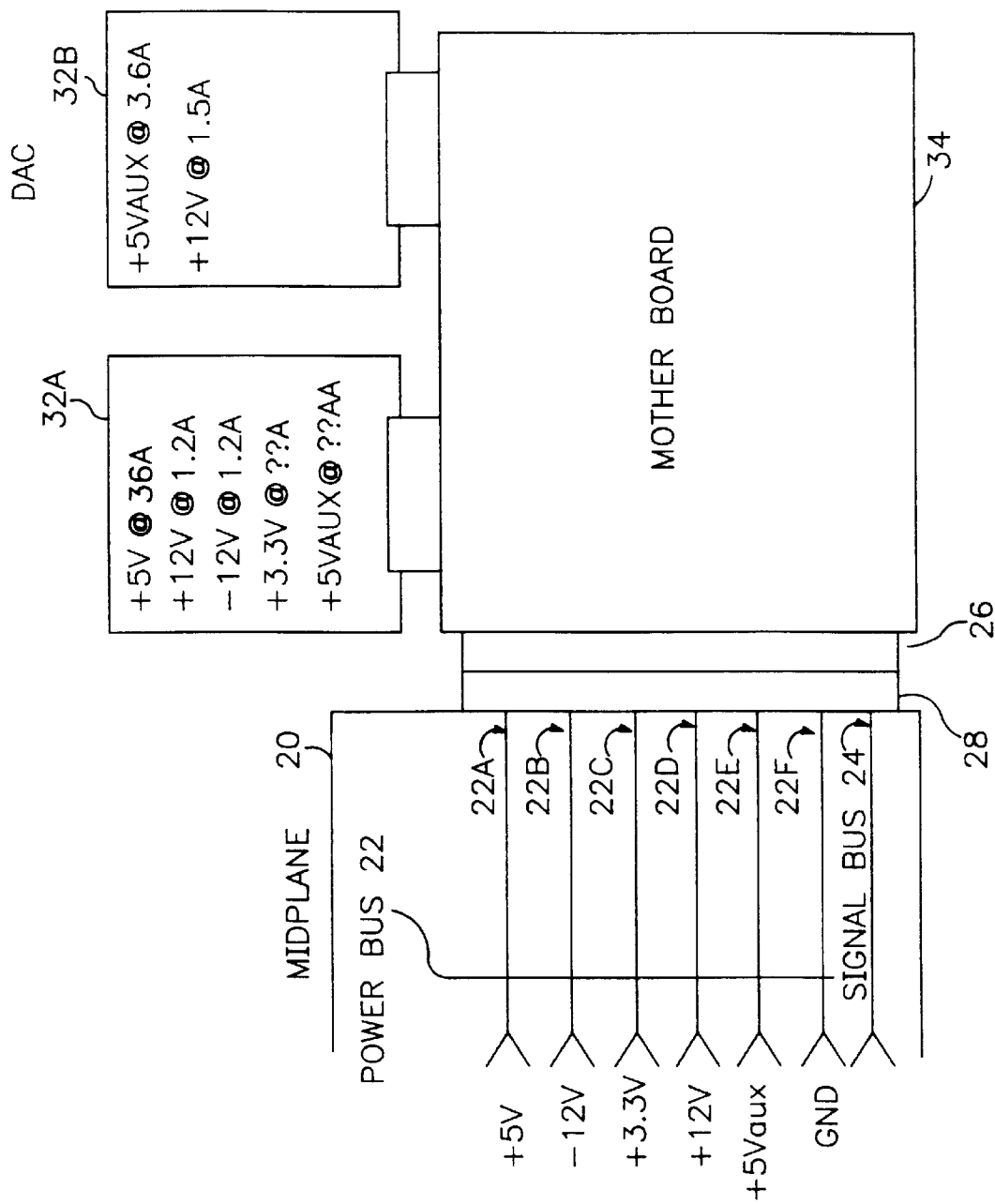
FIG. 2 is a diagrammatic representation of a system logic unit and its connections to system buses.

Referring now to FIG. 2, FIG. 2 is a diagrammatic illustration of the physical configuration of the buses and circuit boards of a computer system incorporating the present invention. In this example, which would be typical of most if not all computer systems, system power is distributed to the components of the system through system power buses running in a Midplane Circuit Board 20 and, in this example, include a +5 Volt Power Bus (+5V) 22A, a −12Volt Power Bus (−12V) 22B, a +3.3Volt Power Bus (+3.3V) 22C, a +12Volt Power Bus (+12V) 22D, a +5Volt Auxiliary Power Bus (+5Vaux) 22E, and a Ground (GND) Bus 22F, referred to generally in the following as Power Buses 22, while logic signals, such as addresses, data and commands are carried through the lines of a Signal Bus 24.

In the present embodiment of the system, and as illustrated in FIG. 2, at least some of the Circuit Boards 32 of the system are connected to the power buses and signal buses of the system through one or more Motherboards 34. In the example shown in FIG. 2, a Motherboard 34 is connected to Power Buses 22 and Signal Bus 24 through a multipin Connector 26 that plugs into a corresponding multipin Socket 28 on Midplane 20 and provides power and signal bus interconnections for a particular type Circuit Boards 32, or a group of related types of Circuit Boards 32. In the present illustration shown in FIG. 2, for example, the Motherboard 34 is an Input/Output (I/O) Motherboard 34 and Circuit Boards 32 generally contain the circuitry and logic for system input/output functions. One set of Circuit Boards 32, for example, may be comprised of Personal Computer Interconnect (PCI) boards, designated as Circuit Boards 32A, as commonly used for input/output functions, while another, designated as Circuit Board 32B, may contain remote system management maintenance circuitry, as described in related U.S. patent application Ser. No. ?.

B. General Description of a Soft Power Switch (FIGS. 3, 4A–4C, 5A, 5B and 6)

Figure 3:
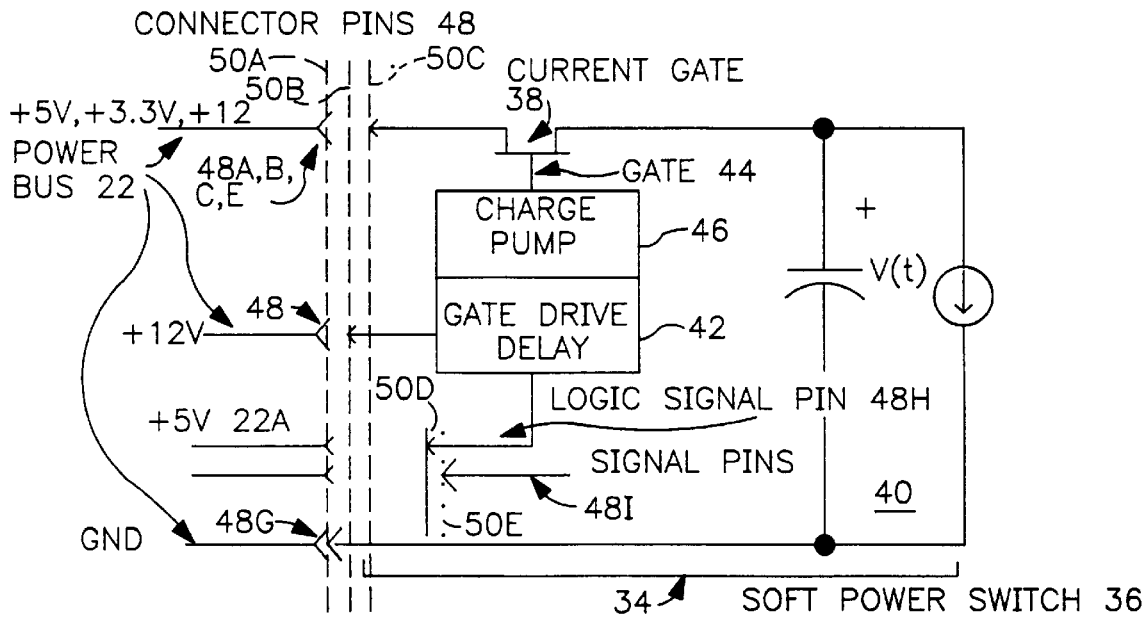
FIG. 3 is a block diagram of a soft switch of the present invention.
Figure 4A:
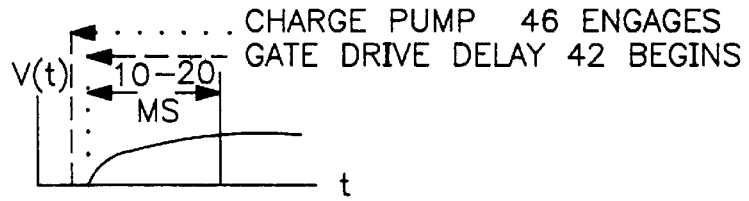
FIGS. 4A, 4B and 4C are timing diagrams illustrating the operation of the soft switch of the present invention.
Figure 4B:
Figure 4C:
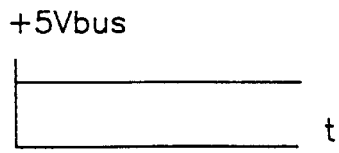

Referring to FIGS. 3 and 4A through 4C, FIG. 3 is a general block diagram of portions of the soft power switch circuitry of the present invention while FIGS. 4A through 4C illustrate the basic operation of the circuitry shown in FIG. 3.

It is assumed in the following that Circuit Boards 32 are plugged into a Motherboard 34 and that the assembly of a Motherboard 34 with one or more Circuit Boards 32 are inserted or removed as an assembly.

As represented in FIG. 3, Soft Power Switch 36 of the present invention resides on Motherboard 34 and includes, for each of Power Buses 22, a Current Gate 38 connected in series between the corresponding Power Bus 22 and the corresponding power buses of Motherboard 34 and thus between Power Bus 22 and the loads presented by the logic and circuitry of the Circuit Boards 32 connected to the Motherboard 34, represented in FIG. 3 as Logic 40. In the present implementation, for example, a Current Gate 38 may be comprised of a MOS-FET transistor, which has the well known and understood characteristic that the resistance through the MOS-FET, that is, between the Power Bus 22 and the Circuit Boards 32, is controlled by a control voltage applied to the gate of the MOS-FET. As a consequence, the resistance presented in the path from the corresponding Power Bus 22 to Circuit Boards 32, and thus the current flowing from the Power Bus 22 to Circuit Boards 32, may be controlled by the control voltage applied to the gate input of the Current Gate 38.

The Soft Power Switch 36 for each of Power Buses 22 further includes a Gate Drive Delay 42 which, as described in detail in the following, generates a Gate Control Signal (Gate) 44 the control input of the Current Gate 38 to control the current flowing through the Current Gate 38. As also illustrated, the Soft Power Switch 36 also includes a Charge Pump 46 connected from +12V 22D that, as also described in the following, provides a local source to power Gate Drive Delay 42 and Current Gate. In the present implementation, Charge Pump 46 provides a 22 volt output that is particularly used in controlling the MOS-FETs of the 5 volt and 3.3 volt Current Gates 38 to provide a voltage level sufficient to insure that the MOS-FETs can be driven into saturation.

It is further illustrated in FIG. 3 that Soft Power Switch 36 resides on the Motherboard 34 and is connected through Connector Pins 48 to Power Buses 22 to receive power from Power Buses 22 when Motherboard 34 is plugged into Power Buses 22. In particular, each of the Current Gates 38 is connected from a corresponding one of +5V 22A, −12V 22B, +3.3V 22C, +12V 22D, and 5Vaux 22E through corresponding Connector Pins 48A, 48B, 48C, 48D and 48E while Charge Pump 46 is connected to +12V 22D through a Connector Pin 48F and a ground connection is made through a Connector Pin 48G. In addition Gate Drive Delay 42 is connected to a +5 volt input from Connector Pin 48A and a +5 volt input from a Logic Pin 48H, which, as will be described in detail in the following, connects to +5V 22A to provide a signal input that is used to detect whether a Motherboard 34 is being inserted or removed and to control the operation of Soft Power Switch 36 as Motherboard 34 is inserted or removed.

It will be noted that it is diagrammatically illustrated in FIG. 3 that Connector Pins 48 are of varying length and thereby make connection with the individual buses of Power Buses 22 in predetermined, staggered sequence as the Connector 26 of a Motherboard 34 is inserted into Socket 28. These points of connection between the connector pins of Motherboard 34 and the pins of Socket 28, and thus with Power Buses 22 and Signal Bus 24 are illustrated diagrammatically in FIG. 3 as Points 50A through 50E.

As illustrated therein, none of Connector Pins 48 are initially in contact with any of Power Buses 22 or Signal Bus 24 just before Point 50A. As Motherboard 34 is plugged into the system, Connector Pin 48G, which extends the furthest, first provides a ground connection to the Soft Power Switch 36 and thus to Motherboard 34 and Circuit Boards 32 at Point 50A.

As Motherboard 34 continues to be plugged into the system, Connector Pin 48F makes contact with Power Bus 22D to provide +12 volts to Charge Pump 46 which, as described further in the following, provides power to Gate Drive Delays 42.

Connector Pins 48A, 48B, 48C and 48E then make contact with the corresponding ones of Power Buses 22 at Point 50C, thereby initially providing +5 volts, +3.3 volts and +12 volts to the corresponding Current Gates 38 and the above described +5 volt input to Gate Drive Delays 42.

Contact is next made by Logic Signal Pin 48H, which thereby connects to +5V 22A at Point 50D and provides +5 volts to Gate Drive Delay 42, the sequence of connections or disconnections by Connector Pin 48A and Logic Signal Pin 48H as Motherboard 34 is inserted or withdrawn thereby, as described in the following, indicating to Gate Drive Delays 42 whether Motherboard 34 is being inserted or withdrawn.

Finally, System Bus Signal Pins 48I then connect with Signal Bus 24 at Point 50E, thereby finally establishing all connections between Motherboard 34 and the buses of the system.

It will be noted that the order in which the connections are made through Connector Pins 48 will be reversed when the Motherboard 34 is removed.

Referring now to FIGS. 4A through 4C as well as FIG. 3, when the Motherboard 34 is plugged into the system buses, that is, into Power Buses 22, and as described above, the first connection made is to the Power Bus 22 ground and the second connection made is to provide +12 volt power to Charge Pump 46 to provide power to the Gate Drive Delays 42. Connection is then made between Motherboard 34 and the 5 volt, 3.3 volt and + and −12 volt buses of Power Buses 22, thereby providing +5 volts, +3.3 volts and +12 volts to the corresponding Current Gates 38. Up to this point, however, Gate 44 signal to the control input of each Current Gate 38 from its corresponding Gate Drive Delay 42 will be "low" and Current Gates 38 will be held in the off state. As a result, and as illustrated in FIG. 4B, no current will flow through the Current Gates 38 to Circuit Boards 32.

As the insertion of the Motherboard 34 continues, however, +12 volts will be provided to Charge Pump 46 and Charge Pump 46 will provide power to Gate Drive Delay 42 so that Gate Drive Delay 42 will begin to generate Gate 44 signals. As represented in FIG. 4B, the Gate 44 signals ramp up from the off state to a level sufficient to drive the corresponding Current Gates 38 into saturation and, as the Gate 44 signals ramp up, the resistance across the Current Gates 38 correspondingly decrease. As illustrated in FIG. 4A, the currents flowing through the Current Gates 38 from +5V 22A, +3.3V 22B and +12V 22C thereby gradually increase to the levels determined by the resistances of Circuit Boards 32.

Finally, the signal connections to Motherboard 34 will be made through Connector Pins 48I as Motherboard 34 becomes fully inserted.

As a result, the current load on Power Buses 22 resulting from inserting a Motherboard 34 into the system is not a surge or spike, but a smoothly increasing load over a time interval that is determined by the time constants of Gate Drive Delays 42 to be within the capacity of the system power supplies to provide increased current without spiking on the power buses, as illustrated in FIG. 4C. It will be appreciated by those of ordinary skill in the relevant arts that this interval is a function of the capacities of the system power supplies and the current loads presented individually and in total by the Circuit Boards 32. In the present implementation, for example, the interval between Point 50D and full, stabilized voltage levels on the Circuit Boards 32 is in the range of 10 to 20 milliseconds.

In addition, as will also be described in further detail in the following, the physical spacing of Connector Pins 48 is determined such that the time required for any user to insert a Motherboard 34 is greater than the time required by Soft Power Switch 36 to stabilize power on the Motherboard 34. This interval has been determined by experiment and measurement to determine the minimum time required to insert a Motherboard 34 wherein test subjects were directed to insert a test Motherboard 34 as rapidly as physically possible.

Figure 5A:
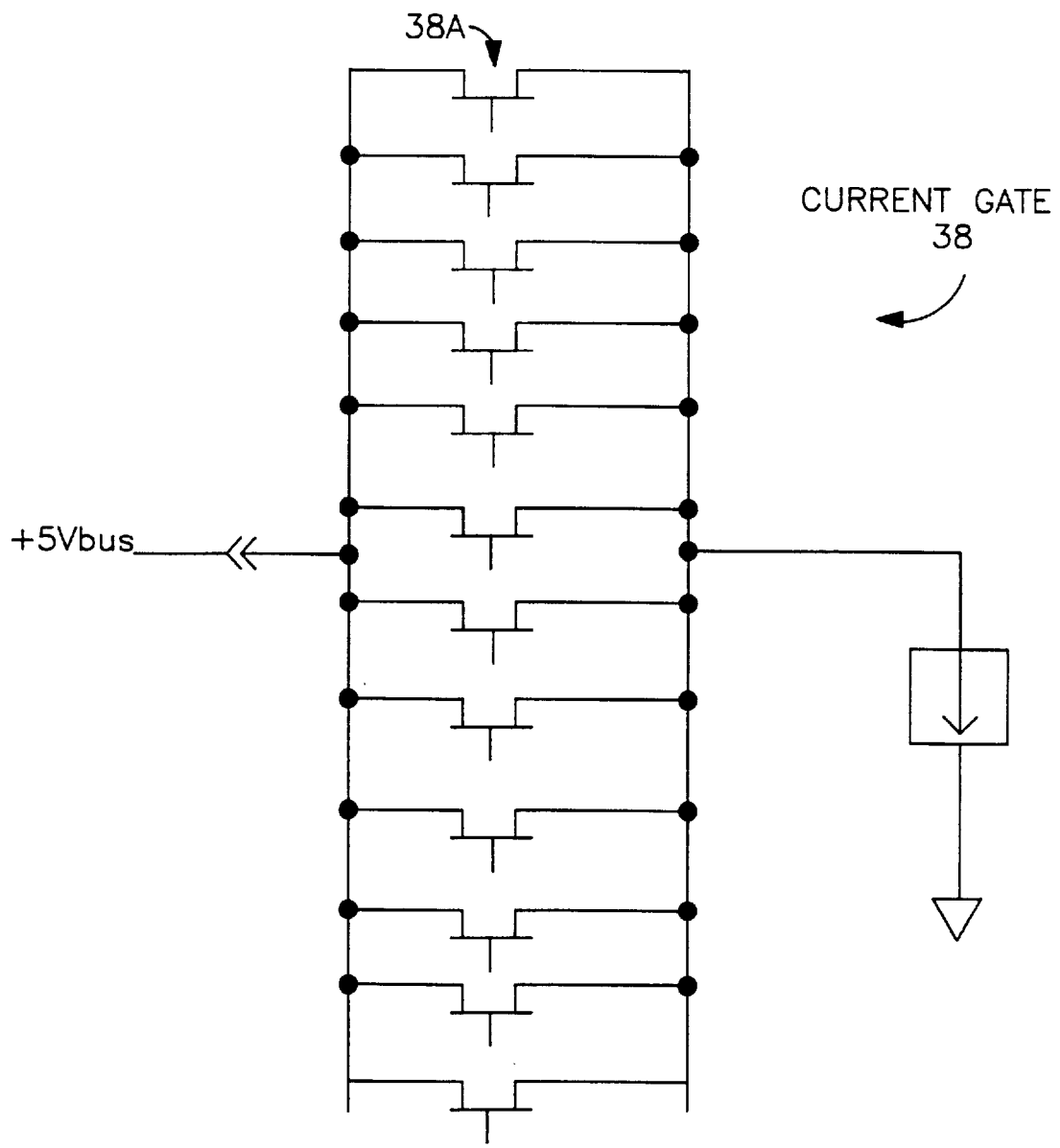

Referring now to FIGS. 5A and 5B, it will be apparent to those of ordinary skill in the arts that a single MOS-FET comprising a Current Gate 38 may not have sufficient current carrying capacity for the total current required by a given Motherboard 34. FIGS. 5A and 5B thereby illustrate two methods for increasing the current capacity of a Current Gate 38 by employing multiple MOS-FETs in the Current Gate 38. As illustrated in FIG. 5A, a plurality of MOS-FETs 38A may be connected in parallel to a single corresponding load on the Motherboard 34 and, as illustrated in FIG. 5B, the load presented by the Motherboard 34 for a given supply voltage may be divided into multiple loads, each load, for example, being a Circuit Board 32, and a MOS-FET 38B connected to each load, with the inputs of the MOS-FETs 38B connected in parallel from the current source and the output of each MOS-FET 38B connected to a single load. The first method has an advantage in that the number of power leads on the Motherboard 34 are reduced and because the failure of a single MOS-FET will not cause the loss of power to one or more Circuit Boards 32 or portions thereof. The first method has the potential disadvantage, however, of current imbalances between the MOS-FETs because of resistance and saturation voltage differences between the MOS-FETs. It is usually found, however, that the imbalances between the MOS-FETs is within acceptable limits are regards the current capacities of the MOS-FETs, particularly when the MOS-FETs are driven into saturation. Also, the current loads tend to be self-balancing as the voltage drop across a MOS-FET increases with the current through the MOS-FET, thereby reducing the current through the MOS-FET. In contrast, the second approach, shown in FIG. 5B, prevents unacceptable current imbalances between MOS-FETs, but has the potential disadvantages of requiring a greater number power leads on the Motherboard 34 and of loss of a one or more Circuit Boards 32 or portions thereof if a MOS-FET fails. As will be seen in the following descriptions, as presently preferred embodiment of the invention uses the approach shown in FIG. 5A.

Figure 6:
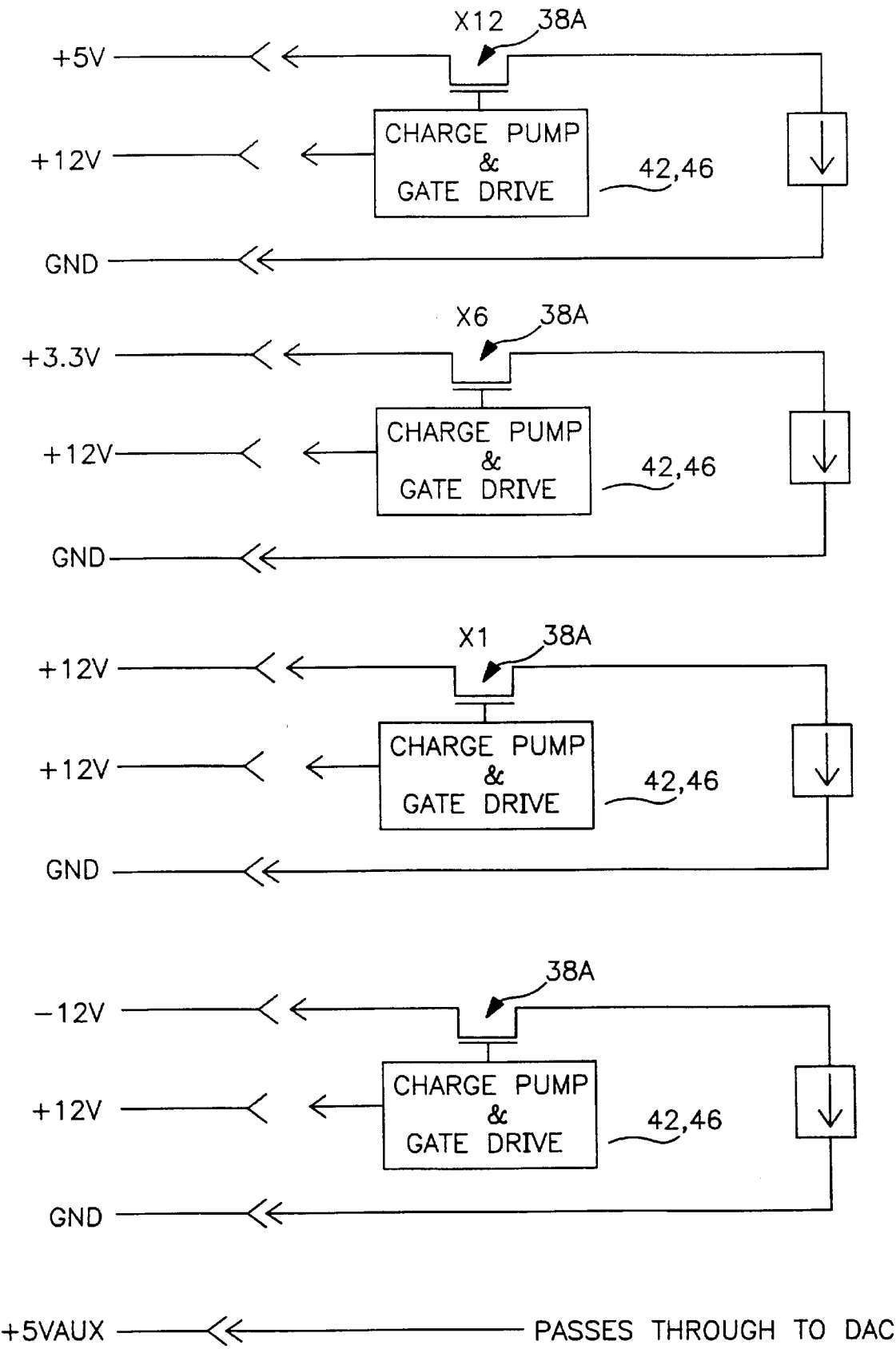
FIG. 6 is a block diagram of a system logic unit incorporating soft switches according to the present invention.

Referring to FIG. 6, therein is shown a more detailed block diagram of the Soft Power Switch 36 of FIG. 3 for a system having 5 volt, 3.3 volt and + and −12 volt supplies. As illustrated therein, and as discussed above, Soft Power Switch 36 is provided with a Current Gate 38 for each supply voltage wherein each Current Gate 38 is comprised of one or more MOS-FETs with, in this example, the 5 volt Current Gate 38 being comprised of 12 MOS-FETs 38A, the 3.3 volt Current Gate 38 being comprised of 6 MOS-FETs 38A, and the + and −12 volt MOS-FETs each being comprised of a single MOS-FET 38A. As also shown, there is a Gate Drive Delay 42 for and associated with each Current Gate 38, and a Charge Pump 46 that is associated with and shared by the Gate Drive Delays 42.

Figure 7:
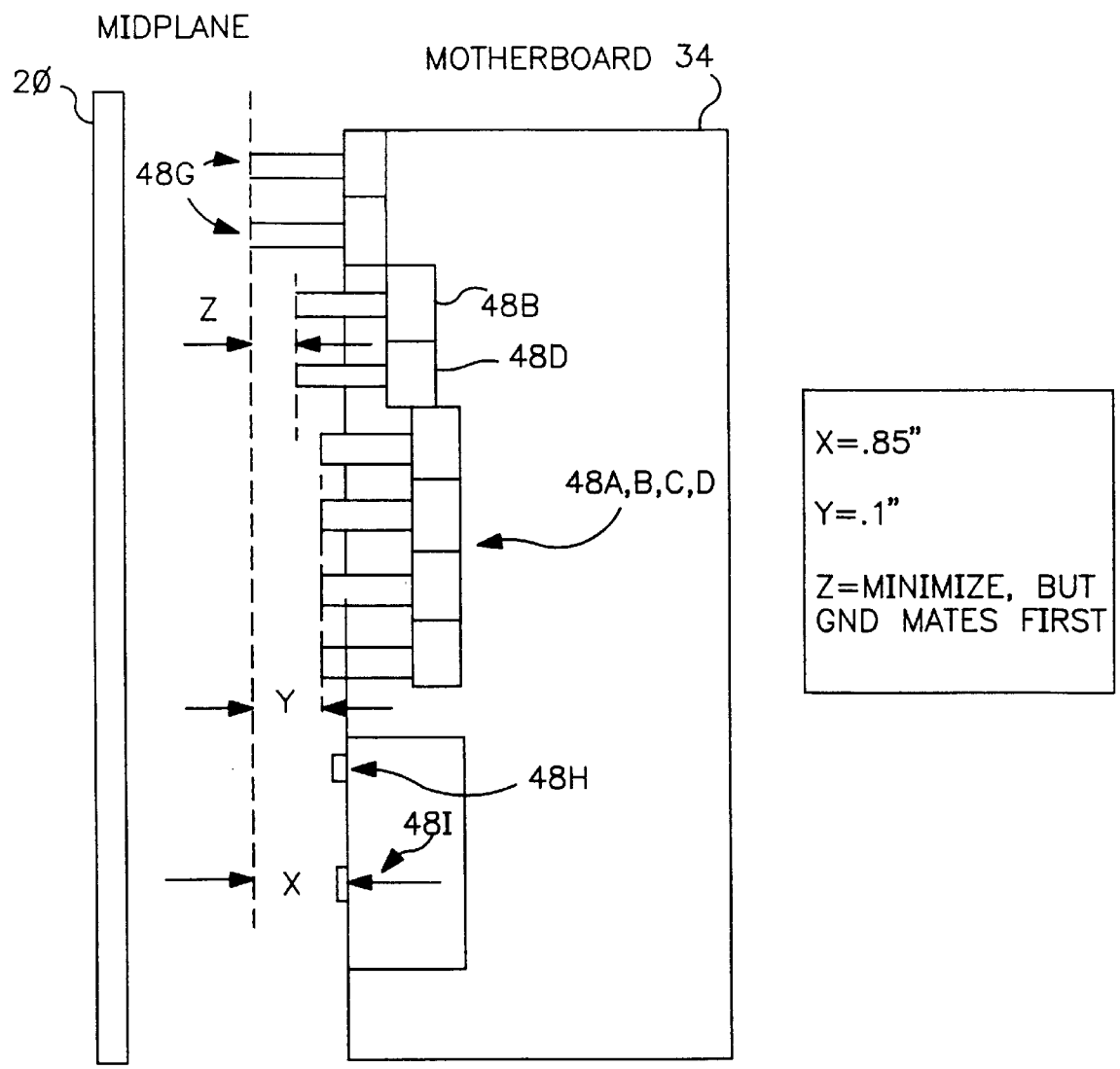
FIG. 7 is a diagrammatic representation of staggered connector pins according to the present invention.

Referring to FIG. 7, therein is illustrated the staggered physical arrangement of Connector Pins 48 to insure the correct sequencing and timing of the connections between the system Power Buses 20 and the circuitry of Soft Power Switch 36. FIG. 7 illustrates the physical arrangement of Connector Pins 48 in a Motherboard 34 Connector 26 under the assumption, as is usual and customary, that the insertable unit, that is, Motherboard 34, carries male pins while the receiving unit carries female sockets to receive the pins.

As is shown in FIG. 7, the ground and − and +12volt pins, Connector Pins 48G, 48B, 48D, extend the furthest from Motherboard 34 and thus make the first contact with the system Power Buses 22. It will be noted that Connector Pins 48G, carrying the ground connection, extend further than do Connector Pins 48B and 48D, so that the ground connection occurs before any other connection when Motherboard 34 is inserted, but that the distance that Connector Pins 48G extend beyond Connector Pins 48B and 48D is minimized. As shown in FIG. 7, the faces or ends of the connector pins connecting the 5 volt, 3.3 volt, +12 volt, −12 volt and +5 volt supplies to Current Gates 38 and the +5 volt input to Gate Drive Delays 42 are shorter than the ground and + and −12 volt pins by approximately 0.85 inch, and thus make connection next. The remaining connector pins, that is, for the signals, are shorter than both the ground and + and −12 volt pins by approximately 1.00 inch, and are thus shorter than the 5 volt and 3.3 volt pins by approximately 0.15 inch, and thus make connection last. It will also be noted that Logic Signal Connector Pin 48H, which provides an input that is used with the +5 volt input from Connector Pin 48A to control the operation of Gate Driver Delay 42, extends slightly beyond the faces of Connector Pins 48I. Logic Signal Connector Pin 48H thereby makes connection after Connector Pins 48A through 48G, but before Connector Pins 48I, to operate in conjunction with the +5 volt signal from Connector Pin 48A to control the ramp up or ramp down of Gates 44 depending upon whether Motherboard 34 is being inserted or withdrawn. Again, this sequence of pin connections will be reversed in the sequence of pin disconnections when the Motherboard 34 is removed.

Finally, FIG. 8 illustrates the sequence of events associated with Soft Power Switch 36 as a Motherboard 34 is inserted or removed. Line A therein represents the state of the +5 volt and +3.3 volt power pins, Line B represents the state of the pins carrying signal into and out of Motherboard 34, that is, Connector Pins 48G of FIG. 3, and Line C represents the state of a flip-flop that, as described in the following, is connected from Logic Pin 48G to indicate whether the Motherboard 34 is being inserted or removed. As will be described in a following detailed description, the state the signal on Logic Pin 48H controls detection logic and a latch that, in turn, controls whether the Gate 44 signals ramp up or ramp down, and thereby whether the current flows through Current Gates 44 are respectively driven to ramp down or up, dependent upon whether Motherboard 34 is being inserted or removed.

FIG. 8 assumes that time moves from left to right, with the Motherboard 34 being inserted and then removed. Therefore, at time T1 12 volts is supplied to Soft Power Switch 36 as the ground and 12 volt power pins make contact as the Motherboard 34 is inserted and a reset of the logic circuitry of Soft Power Switch 36, using the customary resistor-capacitor circuit, is completed by time T2. The 5 volt and 3.3 volt power pins then make contact at time T3, followed by a short period in which the state of the power pins is indeterminate because, for example, of small differences in the lengths of the 5 volt and 3.3 volt power pins. The flip-flop indicating whether Motherboard 34 is being inserted or removed is set at time T3, and remains set until time T4, when Logic Signal Pin 48H makes connection and, shortly thereafter the logic pins, that is, Connector Pins 48G, make contact. The Motherboard 34 is then fully powered and remains so until a subsequent time T5 when Motherboard 34 begins to be removed. At time T5, there is a short indeterminate state on Connector Pins 48G as Connector Pins 48G break contact, followed by Logic Signal Pin 48H and followed by a second short indeterminate state of the power pins as the power pins break contact at time T6.

C. Detailed Description of a Soft Power Switch (FIG. 9)

Figure 9:
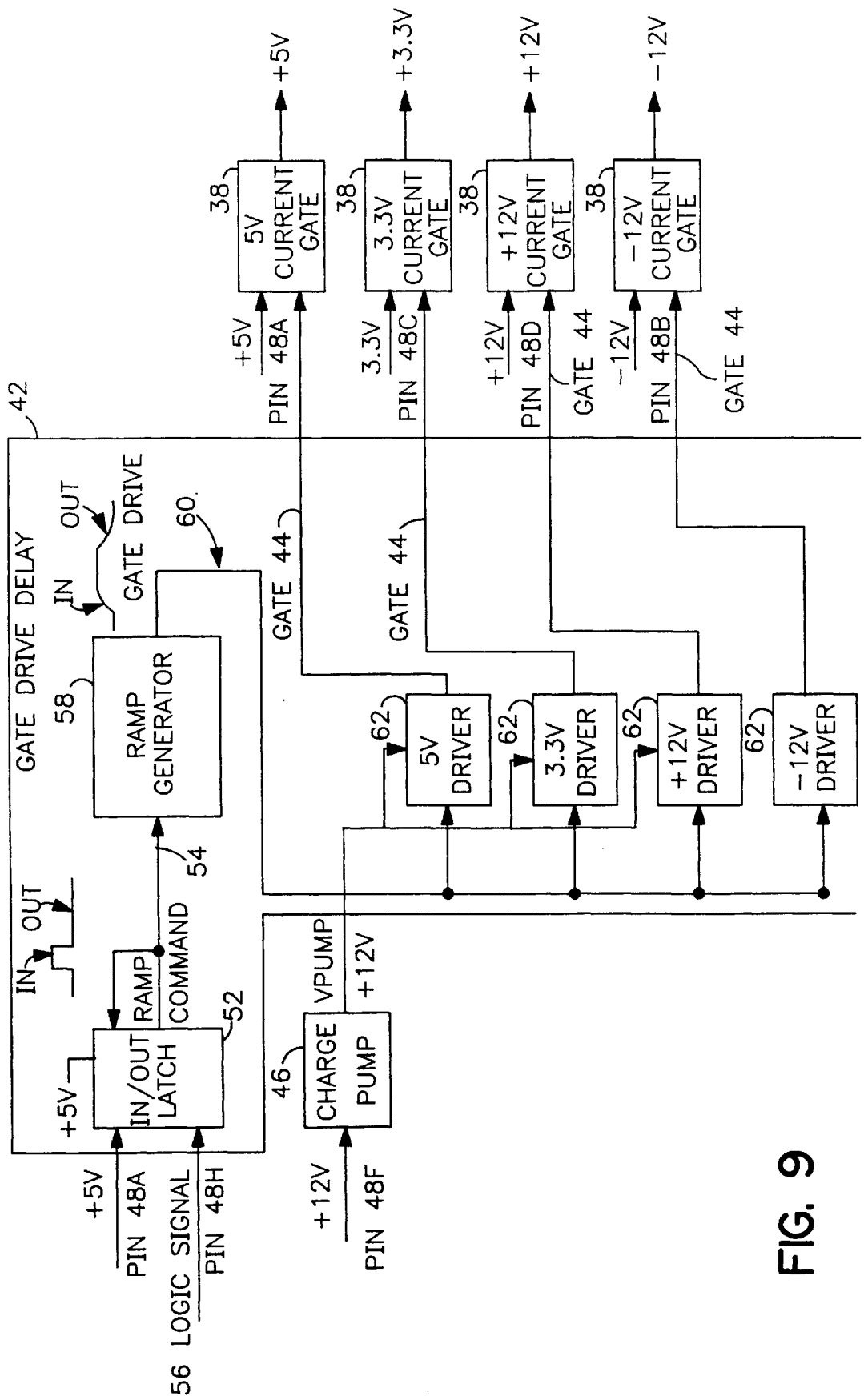

Referring to FIG. 9, therein is presented a more detailed block diagram of a Soft Power Switch 36 of the present invention, shown yet further elements of the structure and operation of Soft Power Switch 36 and, in particular, Gate Drive Delay 42, Charge Pump 46 and the logic associated with Logic Signal Connector Pin 48H.

As indicated therein, and as discussed above, Charge Pump 46 is essentially a local power supply residing on Motherboard 34 and providing +22 volt power to Gate Drive Delay 42 starting at the point in the insertion of Motherboard 34 when Connector Pin 48F has connected to the +12 volt supply of +12V 22D. As discussed and as will be discussed further below, Charge Pump 46 was designed to provide +22 volt power to Gate Drive Delay 42 to provide Gate Drive Delay 42 with a voltage level sufficient to drive Current Gates 38 into saturation. This in turn requires that the supply voltage to Gate Drive Delay 42 be higher than the voltage levels switched by Current Drivers 38 and a 22 volt level was chosen a sufficient for the 5 and 3.3 volt Current Gates 38, which carry the majority of the current supplied to Motherboard 34, as well as the 12 volt Current Gates 38 if the current levels through the 12 volt Current Gates 38 is sufficiently high. It will be understood by those of ordinary skill in the arts that Charge Pump 46 is thereby essentially a regulated dc to dc converter and the design of such will be well understood to those of ordinary skill in the relevant arts without further description.

Referring next to Gate Drive Delay 42, it is shown therein that Gate Drive Delay 42 includes an In/Out Latch 52 that, as discussed above, detects and latches a state indicating whether Motherboard 34 is being inserted or removed and provides an output signal, indicated as Ramp Command 54, indicating whether Motherboard 34 is being inserted or removed. As such, In/Out Latch 52 is provided with a +5 volt input from Connector Pin 48A and a Logic Signal 56 from Logic Signal Connector Pin 48H which, as described previously, connects to +5V 22A when Motherboard 34 is plugged into Socket 28. When Motherboard 34 is being inserted, the logic of In/Out Latch 52 detects the sequence of the appearance of +5 volt power from Pin 48A and a +5 volt Logic Signal 56 from Logic Signal Connector Pin 48H and drives Ramp Command 54 to a "high" state for a predetermined period longer than the time required to completely plug Motherboard 34 into Socket 38 to indicate that Motherboard 34 is being plugged in and that the currents through Current Gates 38 should therefore be driven to ramp up. Ramp Command 54 then returns to the normal "low" state, but In/Out Latch 52 then latches the "high" state of Ramp Command 54 internally, as indicated in FIG. 9, to store that Motherboard 34 is in the inserted state. Then, upon Motherboard 34 being removed from Socket 28, In/Out Latch 52 detects the sequence of Logic Signal 56 going to the "low" state while the +5 volt input from +5V 22A remains at the "high" state to continue to assert Ramp Command 54 in the low state to indicate that, at this time, the currents through Current Gates 38 should be driven to ramp down. It will be understood that In/Out Latch 52 stores the inserted state of Motherboard 34, that is, the fact that Ramp Command 54 has previously been in the "high" state, to avoid confusion as to whether Motherboard 34 is being inserted or removed as there will be a period during both insertion and removal when the +5 volt input from +5V 22A is "high" while Logic Signal 56 is "low". The detailed design of In/Latch 52 will be well understood by those of ordinary skill in the arts, as will be the fact that many very different designs for this function are available, and as such In/Out Latch 52 will not be discussed in further detail.

It is also shown in FIG. 9 that Gate Drive Delay 42 further includes a Ramp Generator 58 which is connected from Ramp Command 54 and is responsive to Ramp Command 54 to generate a Gate Drive 60 output which, in turn, controls the current though Current Gates 38. As has been described previously with reference to FIGS. 4A though 4C and FIG. 3, the Soft Power Switch 36 of the present invention operates to gradually turn on, or ramp up, current through Current Gates 38 during a predetermined time interval when Motherboard 34 is plugged in, starting at the point that Connector Pin 48A makes contact, and to gradually turn off, or ramp down, the current through Current Gates 38 during a similar predetermined time interval when Motherboard 34 is removed, starting when Logic Signal Connector Pin 48H breaks contact. As described above, In/Out Latch 52 generates a Ramp Command 54 whose state during insertion or withdrawal of Motherboard 34 indicates whether Motherboard 34 is being inserted or withdrawn.

As indicated in FIG. 9, Ramp Generator 58 is responsive to Ramp Command 54 to generate Gate Drive 60 which corresponding which ramps, or slopes, up from a "low" state to a "high" state during the previously discussed interval when Motherboard 34 is being inserted and which ramps, or slopes, down from the "high" state to the "low" state during the similar interval when Motherboard 34 is withdrawn. The function, operation and design of a Ramp Generator 58 will therefore be well understood by those of ordinary skill in the relevant arts, as will the fact that many alternates designs are possible to accomplish this function, and Ramp Generator 58 will thereby not be discussed in further detail herein.

Finally, Gate Drive 60 output of Ramp Generator 58 is provided as an input to each of a plurality of Drivers 62, together with 22 volt power from Charge Pump 46. There is a Driver 62 for and corresponding to each Current Gate 38 and each Driver 62 is essentially a voltage follower responsive to Gate Drive 60 to provide Gate 44 outputs to drive the gate inputs of the MOS-FETs comprising Current Gates 38. As Gate Drive 60 ramps up during the insertion of Motherboard 34, therefore, Current Gates 38 will be driven to gradually and correspondingly increase the current permitted to flow through Current Gates 38, thereby providing corresponding gradually increasing power supply currents to Motherboard 34 without spiking on Power Buses 22. In a similar manner, as Gate Drive 60 ramps down during the removal of Motherboard 34, Current Gates 38 will be driven to gradually and correspondingly decrease the current flowing through Current Gates 38, thereby gradually decreasing the power supply currents provided to Motherboard 34, again without spiking on Power Buses 22. Again, the design of Drivers 62 will be apparent to those of ordinary skill in the art, as will alternate designs for implementing this function, so that Drivers 62 will not be discussed in further detail herein.

Finally, it will be noted that certain of Drivers 62, such as the −12V Driver 62, may not be provided with 22 volt power from Charge Pump 46, but instead may be provided with power directly from Power Buses 22, depending in part on whether it is critical that the supply voltage provided through the corresponding Current Gate 38 be stable and adhere to a predetermined turn-on sequence. Also, it may not be necessary to provide a Driver 62 supply voltage sufficient to drive the corresponding Current Gate 38 into saturation in those instances wherein the Current Gates 38 are carrying comparatively little current.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. For example, the number and levels of supply voltages switched through a soft power switch of the present invention may differ from the examples shown herein, and the details of the circuits and components thereof may differ significantly from those illustrated herein. For example, Current Gates 38 may be comprised of transistors or other controllable devices than MOS-FETs. Also, the present invention may be implemented on individual circuit cards rather than on a motherboard, or may be implemented in and for an entire functional unit, such as an entire processing unit, rather than in one or more motherboards or circuit cards therein. Therefore, it is the object of the appended claims to cover all such variation and modifications of the invention as come within the true spirit and scope of the invention.

What is claimed is:

1. A soft power switch for insertion and removal of a logic unit in a system during continuing operation of the system, comprising:

at least one current switch for at least one supply voltage to the logic unit, each current switch having a current input connected from a corresponding system power source and a current output connected to the logic unit, a gate drive delay connected to each current switch for providing a gate signal controlling the flow of current through each current switch, and a connector for connecting the logic unit to a socket connected to at least the power sources of the system, the connector having a staggered plurality of connector pins and the socket having corresponding connecting receptacles, the connector pins including a first connector pin having a first extension to make a first contact between the logic unit and a system ground and between the soft power switch and a system ground as the logic unit connector is inserted into the socket, a second connector pin having a second extension less than the first extension to make a second contact to a system power source as the logic unit connector is inserted into the socket to provide power to the gate drive delay, and a plurality of third connector pins, each having a third extension less than the second extension to make a corresponding plurality of third contacts to corresponding system power sources as the logic unit connector is inserted into the socket, one of the third connector pins providing a logic signal input from the socket to the gate delay driver and others of the third connector pins each providing a corresponding connection between the input of a corresponding current switch and a corresponding system power source, wherein the gate drive delay is responsive to the logic signal input for generating a gate signal upon insertion of the logic unit into the socket that increases with time to correspondingly increase the flow of current through each current gate over a predetermined period of time.

2. The soft power switch of claim 1 wherein:

the gate drive delay is responsive to the logic signal for generating a gate signal upon withdrawal of the logic unit from the socket that decreases with time to correspondingly decrease the flow of current through each current gate over the predetermined period of time.

3. The soft power switch of claim 2 wherein:

the connector pins further include a fourth connector pin having a fourth extension less than the third extension to make a corresponding fourth contact to a system power source to provide a logic signal as the logic unit is inserted into the socket, and the gate delay drive comprises an in/out latch connected from one of the others of the third connector pins and from the logic signal and responsive to a sequence of inputs from the one of the others of the third connector pins and the logic signal for generating a ramp command output indicating that the logic unit is being withdrawn from the socket, a ramp generator responsive to the ramp command for a corresponding gate drive signal that decreases over the predetermined period of time, and for each current gate, a driver connected from the gate drive signal of the ramp generator for generating the corresponding gate signal to the corresponding current gate.

4. The soft power switch of claim 1, further comprising:

a local power supply connected from the second connector pin and receiving system power therefrom to provide power to the gate drive delay to drive the current gates into a saturated state at the end of the predetermined period of time.

5. The soft power switch of claim 1, wherein:

the connector pins further include a fourth connector pin having a fourth extension less than the third extension to make a corresponding fourth contact to a system power source to provide a logic signal as the logic unit is inserted into the socket, and the gate delay drive comprises an in/out latch connected from one of the others of the third connector pins and from the logic signal and responsive to a sequence of inputs from the one of the others of the third connector pins and the logic signal for generating a ramp command output indicating that the logic unit is being inserted into the socket, a ramp generator responsive to the ramp command for a corresponding gate drive signal that increases over the predetermined period of time, and for each current gate, a driver connected from the gate drive signal of the ramp generator for generating a corresponding gate signal to the corresponding current gate.

\* \* \* \* \*